United States Patent
Ishigaki

Patent Number: 5,828,783
Date of Patent: Oct. 27, 1998

[54] APPARATUS AND METHOD FOR INPUT-PROCESSING HAND-WRITTEN DATA

[75] Inventor: Kazushi Ishigaki, Kawasaki, Japan

[73] Assignee: Fujitsu Limited, Kawasaki, Japan

[21] Appl. No.: 955,374

[22] Filed: Oct. 21, 1997

Related U.S. Application Data

[63] Continuation of Ser. No. 626,977, Apr. 3, 1996, abandoned, which is a continuation of Ser. No. 202,135, Feb. 25, 1994, abandoned.

[30] Foreign Application Priority Data

May 19, 1993 [JP] Japan .................................. 5-116712

[51] Int. Cl.⁶ .............................................. G06K 9/00
[52] U.S. Cl. .......................................... 382/186; 382/190
[58] Field of Search ................................. 382/168, 161, 382/171, 173, 176, 180, 181, 182, 183, 184, 185, 186, 187, 188, 189, 190, 191, 192, 193, 194, 195, 201, 203, 209, 217, 224, 225, 226, 229, 230, 231, 232, 305, 317, 321, 197, 202; 283/902; 340/825.34; 345/145; 364/920.7

[56] References Cited

U.S. PATENT DOCUMENTS

| | | | |
|---|---|---|---|
| Re. 34,476 | 12/1993 | Norwood | 382/13 |
| 4,653,107 | 3/1987 | Shojima et al. | 382/13 |
| 4,829,583 | 5/1989 | Monroe et al. | 382/11 |
| 5,093,873 | 3/1992 | Takahashi | 382/16 |
| 5,121,441 | 6/1992 | Chefalas et al. | 382/24 |
| 5,150,424 | 9/1992 | Aguro et al. | 382/13 |
| 5,187,480 | 2/1993 | Thomas et al. | 382/13 |
| 5,191,622 | 3/1993 | Shijima et al. | 382/30 |
| 5,257,074 | 10/1993 | Kamel | 382/13 |
| 5,303,312 | 4/1994 | Comerford et al. | 382/13 |
| 5,339,412 | 8/1994 | Fueki | 382/48 |
| 5,414,228 | 5/1995 | Yamashita | 178/18 |
| 5,467,407 | 11/1995 | Guberman et al. | 382/186 |
| 5,559,897 | 9/1996 | Brown et al. | 382/186 |

FOREIGN PATENT DOCUMENTS 3-214309  9/1991  Japan .................................. G06F 3/03

OTHER PUBLICATIONS

Digital, Computer Fundamentals, Chu, McGraw Hill Book Company, Inc. NY 1962 (pp. 392–393 & 325–326).

*Primary Examiner*—Leo H. Bourdreau
*Assistant Examiner*—Bijan Tadayon
*Attorney, Agent, or Firm*—Staas & Halsey

[57] ABSTRACT

In a system for input-processing hand-written data, the pattern of a hand-written character is not entirely registered during the registration of a symbol input but, instead, a combination of a recognizable character and an input element is registered. During hand-written input, a particular identification stroke that can be easily identified is added to the recognizable character. The particular identification stroke is picked up by a stroke detection unit from the pattern of the input hand-written character, this stroke is deleted by a stroke deletion unit, and the resulting pattern of the character is subjected to the confirmation processing by a hand-written character confirmation unit, and an input element that has been registered in relation to the confirmed character code is output.

11 Claims, 14 Drawing Sheets

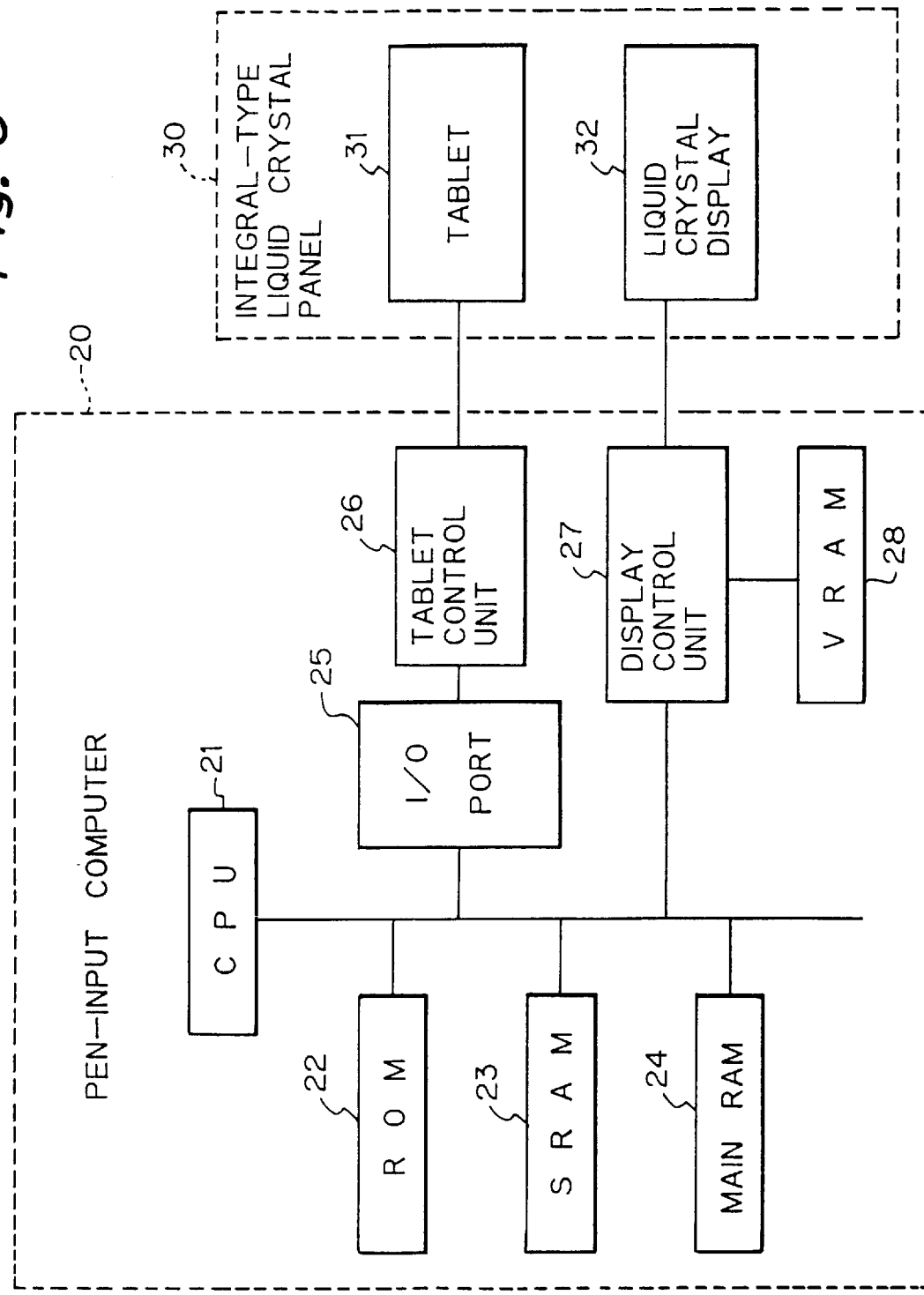

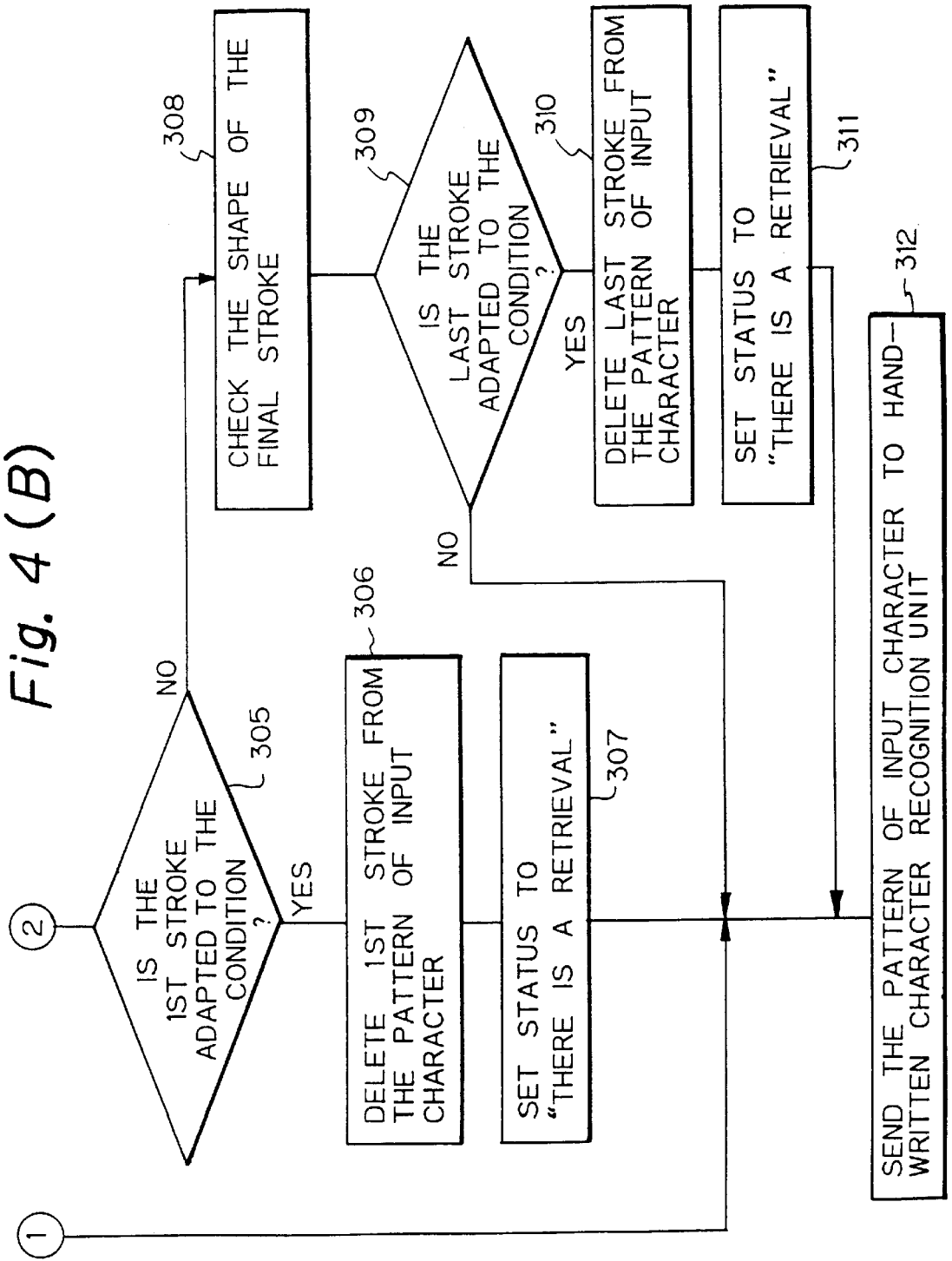

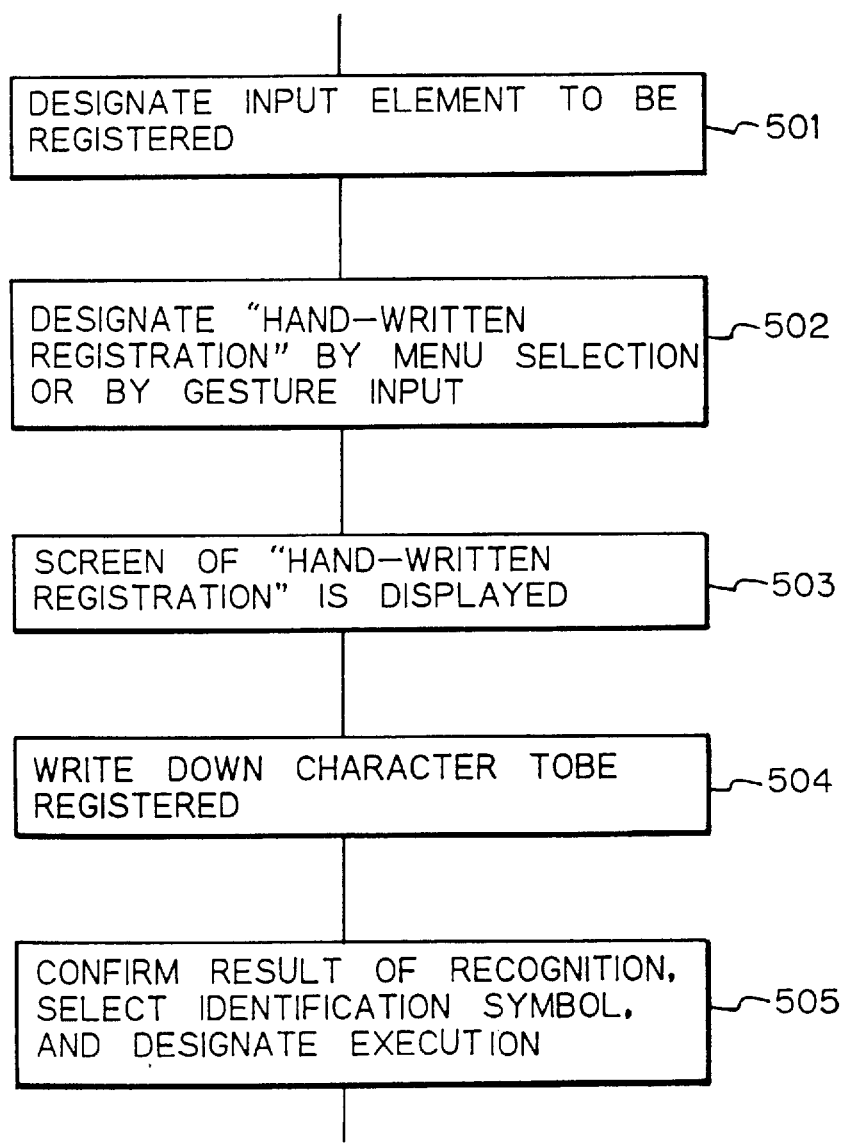

Fig. 7(A)

APRIL 12TH–18TH WEEKLY SCHEDULE TABLE

M o n . 1 2
9:30    INDOOR MEETING
13:00   ○△□ DIRECTOR FUJITA

T u e . 1 3
9:00    ○△□ VISIT NUMAZU FACTORY
        0234-56-7890
18:00   NEW TRUNK LINE, HIKARI,
        NO.213

W e d . 1 4
10:00   CALL MISS SHIMAKAGE
        FUJISAN INSTITUTE

T h u . 1 5
        ANNUAL SCHEDULE OF VACATIONS
        TOKYO DISNEY LAND
7:30    DEPARTURE

F r i . 1 6
        CALL GENERAL AFFAIRS
        SECTION, HEAD OFF
        AFTERNOON, SECTION CHIEF YAMADA
19:00   RECEPTION PARTY FOR
        MR.MATSUI, SHINJO

S a t . 1 7
        WORK ON HOLIDAY
        FINISH SPEC
        UNTIL MONDAY

APRIL 12TH–18TH WEEKLY SCHEDULE TABLE

Mon.12
- 9:30 INDOOR MEETING
- 13:00 O△□ DIRECTOR FUJITA

Tue.13
- 9:00 O△□ VISIT NUMAZU FACTORY
  0234-56-7890
- 18:00 NEW TRUNK LINE. HIKARI. NO.213

Wed.14
- 10:00 CALL MISS SHIMAKAGE
  FUJISAN (IN)STITUTE

Thu.15
- ANNUAL SCHEDULE OF VACATIONS
- TOKYO DISNEY LAND
- 7:30 DEPARTURE

Fri.16
- CALL GENERAL AFFAIRS SECTION. HEAD OFF
- AFTERNOON, SECTION CHIEF YAMADA RECEPTION PARTY FOR
- 19:00 MR.MATSUI, SHINJO

Sat.17
- WORK ON HOLIDAY
- FINISH SPEC
- UNTIL MONDAY

Sun.18

APRIL 12TH–18TH    WEEKLY SCHEDULE TABLE

Mon.12                    Thu.15
9:30 INDOOR MEETING        ANNUAL SCHEDULE OF VACATIONS
13:00

HAND-WRITTEN REGISTRATION

TO BE REGISTERED    FUJISAN INSTITUTE

CHARACTER
TO BE REGISTERED

IDENTIFICATION  ○ CIRCLE   ◎ DOUBLE
SYMBOL                         CIRCLE

CANCEL

Fig. 8 (B)

HAND-WRITTEN REGISTRATION

TO BE REGISTERED | FUJISAN INSTITUTE |

CHARACTER
TO BE REGISTERED | F |

IDENTIFICATION ○ CIRCLE
SYMBOL         ◎ DOUBLE CIRCLE ( CANCEL )

APPARATUS AND METHOD FOR INPUT-PROCESSING HAND-WRITTEN DATA

This application is a continuation of application Ser. No. 08/626,977, filed Apr. 3, 1996, now abandoned, which is a continuation of application Ser. No. 08/202,135, filed Feb. 25, 1994, now abandoned.

BACKGROUND OF THE INVENTION

1. Field of the Invention

The present invention relates to a system for input-processing hand-written data in pen-input (hand-written-input) computers having a function of recognizing hand-written characters. More specifically, the invention relates to a system for inputting into a computer frequently used character strings, commands and figures using a hand-written symbol.

It is expected that pen-input computers will find widespread use in the future because: (1) computer systems have become small and light, (2) a device made up of a display and a pen coordinate input unit as a unitary structure has appeared, (3) a pen-input operating system (OS) has appeared, and (4) advanced technology is now available for recognizing hand-written characters.

In pen-input computers, hand-written input, using a pen instead of a keyboard, serves as the most fundamental data input method.

The present invention is concerned with a pen-input computer system which makes it possible to input character strings, command strings and figures, which are frequently used by a user using a symbol of a simple operation.

2. Description of the Related Art

In a conventional keyboard-based computer system, complex character strings and commands frequently used by the user are input through a simple operation such as (1) a method of registering them in a PF (programmable function) key, or (2) a method of registering the words using a kana-kanji conversion unit.

In a widely used operating system, for example, it is allowed to register any character strings into PF keys which are normally provided up to 20 by using a command called KEY SET. Once registered, a depression of the PF key gives the same effect as that of inputting the registered character string through the keyboard.

Furthermore, word processors generally have a function of "word registration" using which any character string can be registered in the form of a kana character string. For instance, if a character string "Dear Sirs: We hope your company is enjoying ever greater business." is registered for a kana character string "Dear Sirs:", then, "Dear Sirs: We hope your company is enjoying ever greater business." is input by simply depressing a "conversion key" after "Dear Sirs:" is input in kana characters.

Computer systems now widely use the function for simply inputting the character strings and command strings frequently used by the user by utilizing the "kana-kanji conversion" and "PF Keys".

However, since the use of the keyboard as an input method is a prerequisite, this function cannot be used with the pen-input computers without problems.

For example, registration using the PF key mentioned in (1) above cannot be used since the pen-input computer, usually, does not have PF keys. The method of word registration using the kana-kanji conversion unit mentioned in (2) above can be used in principle even in the pen-input computer but involves difficulty since the kana-kanji conversion with the pen input is not as easy as with the keyboard (in practice, kanji is in most cases input by being hand-written).

In addition to the keyboard-based method of inputting registered characters, there has been known an easy input method for pen-input computers which uses a character pattern-learning function in a hand-written character recognizing unit. The character pattern-learning function of the hand-written character recognizing unit is one which suitably registers the pattern of a character written by the user into a hand-written character recognition dictionary and, when the same character pattern is written down by the user after it has been registered, recognizes the character (or character string) registered in this character pattern.

The character pattern-learning function was first used in order to enhance the recognition performance by registering character patterns of characteristic styles of the user. By further utilizing this function, it has been attempted to register any character in a special character pattern that will not be mistaken as other characters, and to input the registered character string by writing down this special character pattern. Here, what can be registered are generally characters or character strings, but some examples have been expanded to general input elements such as command strings and figures.

For instance, if a character string "Climb Mt. Fuji" is registered in a character pattern F, then, "Climb Mt. Fuji" can be input by simply writing down F.

The simple hand-written input system relying upon the above-mentioned conventional character pattern-learning function involves the following problems.

(1) An expensive storage medium must be used as a medium for storing a recognition dictionary registered by the user.

(2) Recognition performance is not high for recognizing the character pattern registered by the user.

(3) The operation of registering the character pattern is cumbersome.

These problems (1) to (3) will be described below in detail.

(1) Problem of storage medium.

In a method of registering the recognized character pattern, it is necessary to store both the data of the registered character pattern and the input element such as a character string corresponding to the pattern of the registered hand-written character.

The dictionary for recognizing the hand-written characters must have a large capacity and to which access must be made at high speed. Usually, therefore, the data are in many cases stored in a less expensive ROM (read-only memory). However, the data of the pattern of the character that is additionally registered during the operation is stored in a random access memory (usually, SRAM or DRAM with a back-up function). These media are more expensive than the ROM.

(2) Problem of recognition rate.

The data of the pattern of the registered hand-written character is stored in a converted a form (recognition dictionary form) suited to recognition processing, and this conversion processing is automatically carried out. In the recognition algorithm used for recognizing the pattern of the character registered by the user, therefore, the recognition dictionary is limited to a system which can be automatically synthesized (e.g., a simple pattern-matching method which uses the data of the character pattern itself as an entry to a dictionary).

Such a recognition algorithm has a problem of a generally low recognition rate as compared with a recognition algorithm which utilizes a dictionary that is prepared through complex steps by incorporating the knowledge of persons who have developed dictionaries. Moreover, the user does not necessarily write down the character of the same pattern as that of the registered character. Some systems, therefore, make it necessary to write down the character pattern a plurality of times to obtain stable recognition performance. In this case, the operation of registration becomes very complex.

(3) Problem of operability.

The operation for registering the pattern of a hand-written character is more complex than the operation for registering a word by the kana-kanji conversion. The registration of a word by the kana-kanji conversion system is accomplished by (1) depressing a function key several times and moving the cursor, and (2) inputting "phonetic kana letters", whereas the registration of the pattern of a hand-written character, usually, requires (1) the execution of a utility program for registering the pattern of a hand-written character, (2) designation (input) of an input element such as a character string that is to be registered, and (3) input of the pattern of the registered hand-written character. In particular, the final inputting of the pattern of the hand-written character must be carefully effected in order to obtain stable recognition without adversely affecting the recognition of other characters.

SUMMARY OF THE INVENTION

The object of the present invention is to provide a system for input-processing hand-written data which is free from the above-mentioned problems, and enables complex character strings and command strings to be input through a simple hand-written procedure.

According to the present invention, there is provided an apparatus for input-processing hand-written data in a computer system having a hand-written character input unit and a hand-written character recognition unit, comprising a registration unit for registering an input element such as any character string, command string or a figure designated by a user in relation to any recognizable character; a stroke detection unit for detecting the presence of a particular one or a plurality of strokes that satisfy a predetermined condition from the pattern of a hand-written character that is input;

a stroke deletion unit which, when a particular stroke is detected, deletes this stroke from the pattern of the input character and sends the pattern to said hand-written character recognition unit; and a retrieval unit which, when the particular stroke is detected, detects the presence of an input element that has been registered by said registration unit in relation to a character recognized by said hand-written character recognition unit, and, when there is the input element that has been registered, outputs the registered input element as a result of recognition instead of outputting the recognized character.

The stroke detection unit detects the stroke as a particular stroke by determining whether the first or the last stroke of the pattern of the input hand-written character has a particular shape, if the pattern of the input hand-written character has two or more strokes.

When said hand-written character recognition unit cannot recognize the character from the pattern of the input character from which the particular stroke is detected by said stroke detection unit and from which the particular stroke is deleted by said stroke deletion unit, the recognition processing is effected again for the original pattern of the input character from which the particular stroke is not deleted.

Further, there are a plurality of kinds of strokes that can be detected by said stroke detection unit; said registration unit registers a different input element for every kind of stroke detected for a recognizable character; and said retrieval unit retrieves and outputs an input element that is registered depending upon a recognized character code and upon the kind of the detected stroke.

When said hand-written character recognition unit nominates a plurality of character codes as candidates as a result of recognizing the pattern of an input character from which the particular stroke is detected by said stroke detection unit and from which said stroke is deleted by said stroke deletion unit, said retrieval unit detects the presence of input elements that have been registered in relation to the character codes in the order of decreasing probability starting from a character code that is judged to be most probable among a group of candidate characters, and outputs the input element when it has been registered.

BRIEF DESCRIPTION OF THE DRAWINGS

The present invention will be more clearly understood from the description as set forth below with reference to the accompanying drawings wherein:

FIG. 3 is a schematic block diagram of when the present invention is put into practice by utilizing a microprocessor.

FIG. 4(B) is a flow diagram (2) illustrating the processes of the stroke detection unit and the stroke deletion unit.

FIG. 6 is a flow diagram illustrating the registration operation by the registration unit.

FIG. 7(A) is a diagram illustrating an example (1) of a screen designating the input element.

FIG. 7(B) is a diagram illustrating an example (2) of a screen designating the input element.

FIG. 8(A) is a diagram illustrating an example (1) of a screen of hand-written registration.

FIG. 8(B) is a diagram illustrating an example (2) of a screen of hand-written registration.

DESCRIPTION OF THE PREFERRED EMBODIMENTS

Figure 1:
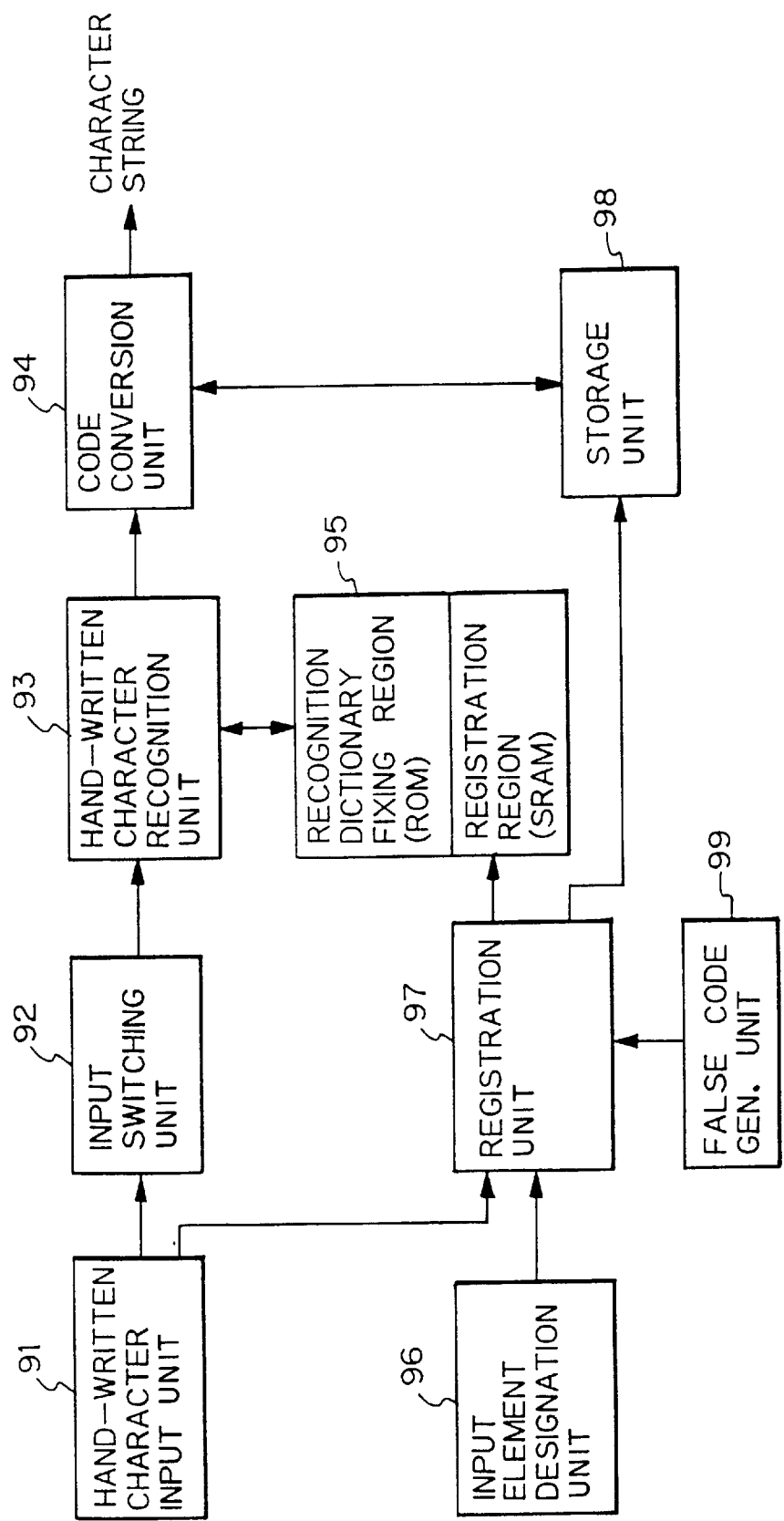
FIG. 1 is a block diagram for easy inputting relying upon a conventional character pattern-learning system.

Before describing the preferred embodiments according to the present invention, examples of the related art are provided with reference to accompanying drawings FIG. 1.

FIG. 1 is a functional block diagram of a system having a conventional character pattern-learning function.

In FIG. 1, the pattern of a hand-written character input through a hand-written character input unit 91 is, usually, sent by an input switching unit 92 to a hand-written character recognition unit 93 where recognition is effected by referring to a recognition dictionary 95, and the result of the recognition is output through a code conversion unit 94.

In a character pattern registration mode which is controlled by a registration unit 97, the hand-written character input unit 91 outputs the pattern of a hand-written character through the input switching unit 92, an input element designation unit 96 outputs an input element (usually, a character string), and a false code generating unit 99 outputs a false character code (false code) that has not been registered to the recognition dictionary 95; the hand-written data thereof and the false code data are registered to the registration region of the recognition dictionary 95. Furthermore, a combination of the false code and the input element is stored in a storage unit 98.

When the pattern of the hand-written character previously registered is written down by the user under an ordinary input condition in which the character pattern registration mode is no longer maintained, the hand-written character recognition unit 93 outputs a false code that is previously registered as a result of recognition. Upon detecting the false code, the code conversion unit 94 retrieves the storage means 98, takes out an input element that has been stored together with the above false code as in combination, and outputs the input element instead of the false code.

However, in such a conventional system, where are some problems as mentioned in the description of the Related Art.

Figure 2:
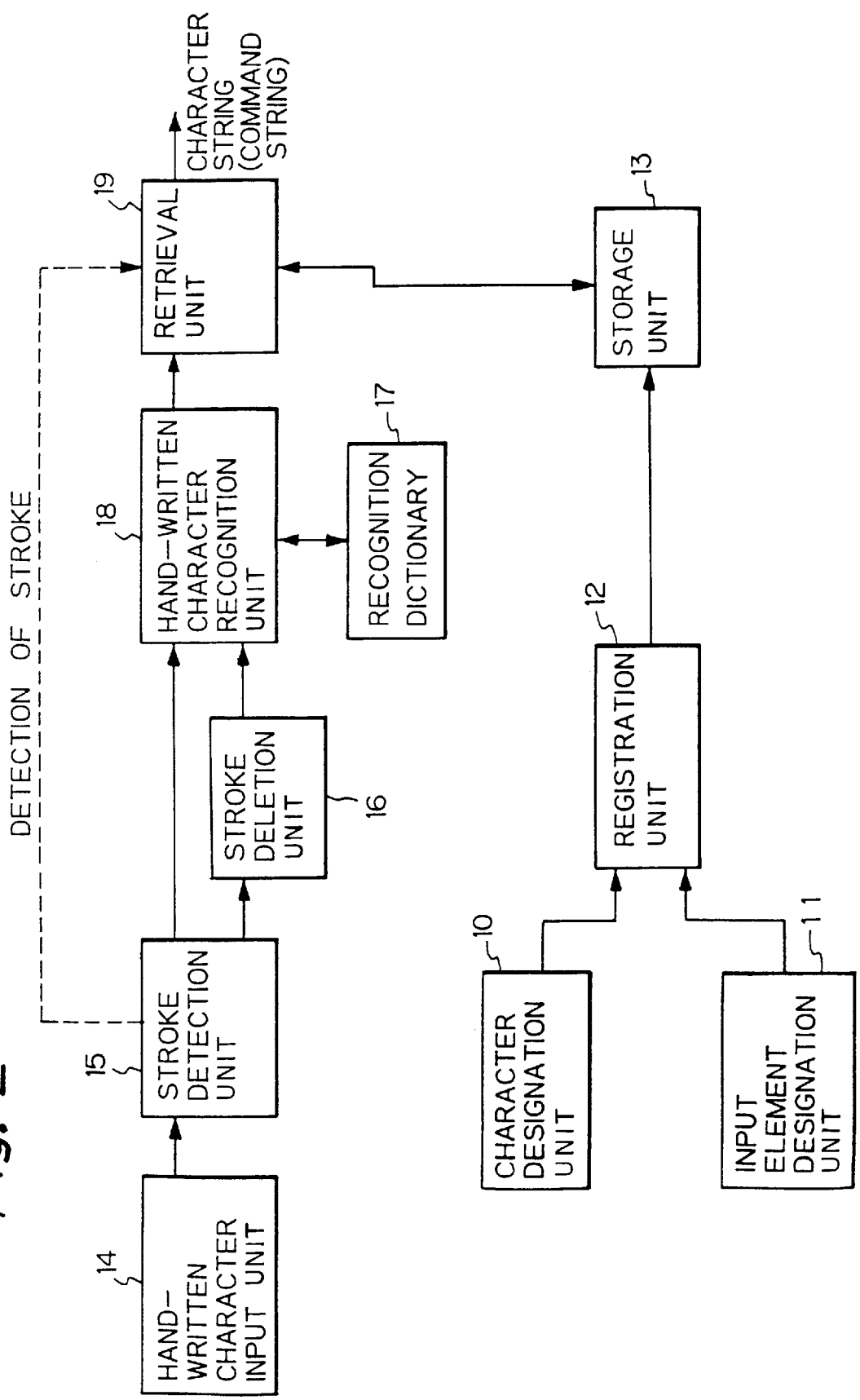
FIG. 2 is a block diagram illustrating the principle of the present invention.

FIG. 2 is a block diagram illustrating the principle of the present invention.

In FIG. 2, reference numeral 10 denotes a character designation unit for designating a character that is to be registered, 11 denotes an input element designation unit for designating an input element that is to be registered in relation to the above character, 12 denotes a registration unit, 13 denotes a storage unit for storing a combination of the character and the input element that are stored, 14 denotes a hand-written character input unit, 15 denotes a stroke detection unit, 16 denotes a stroke deletion unit, 17 denotes a recognition dictionary used for recognizing the hand-written character, 18 denotes a hand-written character recognition unit, and reference numeral 19 denotes a retrieval unit.

The present invention is concerned with a system for input-processing ordinary hand-written data constituted by a hand-written character input unit 14 for inputting a hand-written character and a hand-written character recognition unit 18 for recognizing the hand-written character. The present invention further comprises a registration unit 12 for registering an input element such as a character string, a command string or a figure designated by a user in relation to a recognizable character; a stroke detection unit 15 for detecting the presence of a particular stroke (group) that satisfies a predetermined condition from the pattern of a hand-written character that is input; a stroke deletion unit 16 which, when a particular stroke (group) is detected, sends the pattern of the input hand-written character from which said stroke (group) has been deleted to said hand-written character recognition unit 18; and a retrieval unit 19 which, when the particular stroke (group) is detected, detects the presence of an input element that has been registered by said registration unit 12 in relation to the character recognized by said hand-written character recognition unit 18, and, when there is an input element that has been registered, outputs the registered input element as a result of recognition instead of outputting the recognized character.

According to the present invention, the pattern of the hand-written character is not entirely registered but, instead, a combination of a recognizable character and an input element only is registered. Then, a stroke (group) that can be easily recognized is written down being added to the recognizable character, in order that an input element that is registered in advance can be input.

In FIG. 2, the stroke detection unit 15 judges whether the pattern of the hand-written character input from the hand-written character input unit 14 has a particular stroke (group) that can be used for inputting a brief sketch. When a particular stroke (group) is not detected, the pattern of the input hand-written character is directly sent to the hand-written character recognition unit 18.

The hand-written character recognition unit 18 recognizes the character and outputs the result of recognition to the retrieval unit 19. When the particular stroke (group) is not detected by the stroke detection unit 15, the retrieval unit 19 directly outputs the character that is input.

When the character is designated by the character designation unit 10 and an input element such as a character string is designated by the input element designation unit 11, on the other hand, the registration unit 12 stores a combination thereof in the storage unit 13.

When the stroke detection unit 15 detects the particular stroke (group) in the pattern of the input character, the pattern of the input character is sent to the stroke deletion unit 16 which deletes the particular stroke (group) from the pattern of the input character, and the pattern of the input character from which the stroke is deleted is sent to the hand-written character recognition unit 18. When the hand-written character recognition unit 18 determines the recognized character, the retrieval unit 19 retrieves any input element that has been stored together with the recognized character and outputs the input element as a result of recognition if the input element exists.

When no input element is found that is registered as the recognized character, then the recognized character may be directly output or the user may be informed of that the input element is not found (or, in other words, the character has not been registered). Or, when the input element is not found, the recognition processing may be executed again for the pattern of the input character of before the stroke is deleted by the stroke deletion unit 16.

The particular stroke (group) detected by the stroke detection unit 15 may be any one provided it can be easily written down and can be easily discriminated from the strokes constituting ordinary characters. For instance, the strokes satisfying the following conditions are practicable.

Condition 1: The pattern of the input character consists of two or more strokes.

Condition 2: It is the first or the last stroke of the pattern of the input character.

Condition 3: The stroke has a circular shape and is so written down as to surround a group of the remaining strokes of the pattern of the input character.

According to the present invention, there is no need to register the pattern of the hand-written character or to use an expensive storage medium of a large capacity for storing the pattern of the registered character. Moreover, only predetermined patterns of the characters need be recognized. Therefore, the invention offers such merits that the recognition performance is higher than that of the conventional systems and the operation for registration is relatively simple.

FIG. 3 is a schematic block diagram of when the present invention is put into practice by utilizing a microprocessor. In the drawing, reference numeral 20 denotes a pen-input computer which comprises a CPU 21 for executing a program, a ROM 22 used for the recognition dictionary 17 and the like of FIG. 2, an SRAM 23 used as the storage unit 13 of FIG. 2, a main RAM 24 used for the buffer memory, an I/O port 25 for input and output, a tablet control unit 26 for controlling the tablet, a display control unit 27 for controlling the display, and a VRAM 28 for storing data that are to be displayed on the display unit. Reference numeral 30 denotes an integral-type liquid crystal panel which comprises a tablet 31 connected to the tablet control unit 26 and a liquid crystal display 32 connected to the display control unit 27.

In this embodiment, the hand-written character input unit 14 shown in FIG. 2 is realized by the tablet 31. The storage unit 13 is realized by the SRAM 23, the recognition dictionary 17 is realized by the ROM 22, and other units are realized by programs executed by the CPU 21.

Figure 4A:
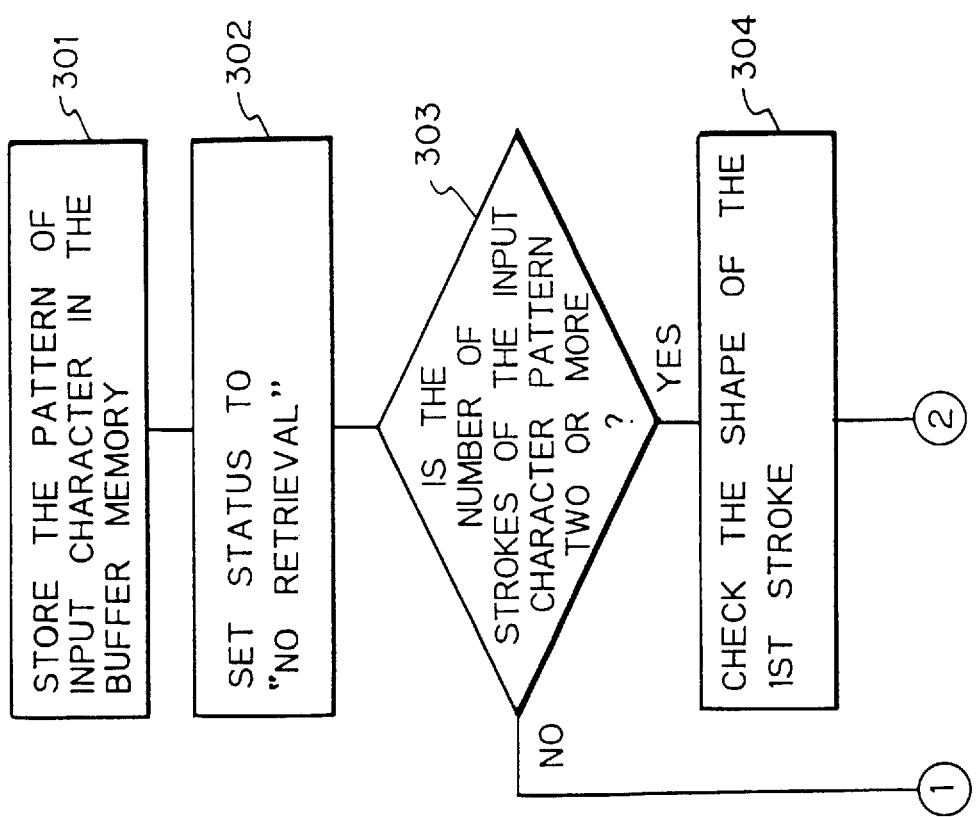
FIG. 4(A) is a flow diagram (1) illustrating the processes of the stroke detection unit and the stroke deletion unit.

FIGS. 4(A) and 4(B) are a flow diagram of a process for realizing the stroke detection unit 15 and the stroke deletion unit 16 of FIG. 1 according to the embodiment.

The stroke detection unit 15 stores the pattern of the character input from the tablet 31 which is the hand-written character input unit 14 in a buffer memory in the main RAM 24 (step 301), and sets the status flag provided in the main RAM 24 into the state of "no retrieval" (step 302). Then, a step 303 checks the number of strokes of the pattern of the input character and, then, checks the shapes of the first stroke and the last stroke (steps 304 and 308).

The checking conditions are, for example, "The stroke has a circular shape and is so written as to surround a group of the remaining strokes of the pattern of the input character" or not. When it is judged by steps 305 and 309 that the above conditions are satisfied, the stroke deletion unit 16 deletes the first stroke or the last stroke from the pattern of the input character (steps 306 and 310), and the status flag in the main RAM 24 is set to "there is a retrieval" (steps 307 and 311). Then, the pattern of the input character from which the above stroke is deleted is sent to the hand-written character recognition unit 18 (step 312).

When the conditions are not satisfied, the original pattern of the input character is directly sent to the hand-written character recognition unit 18 while leaving the status flag to be "no retrieval"

In this embodiment, even the hand-written character recognition unit 18 is realized as a program to be executed by the CPU 21, and the recognition program itself and the dictionary for recognition are stored in the ROM 22. The result of recognition is sent in the form of a character code to the retrieval unit 19 of the next stage. Even the retrieval unit 19 is realized as a program that is to be executed by the CPU 21. The method of recognition by the hand-written character recognition unit 18 can be realized by using a variety of known technologies and is not described here in detail.

Figure 5:
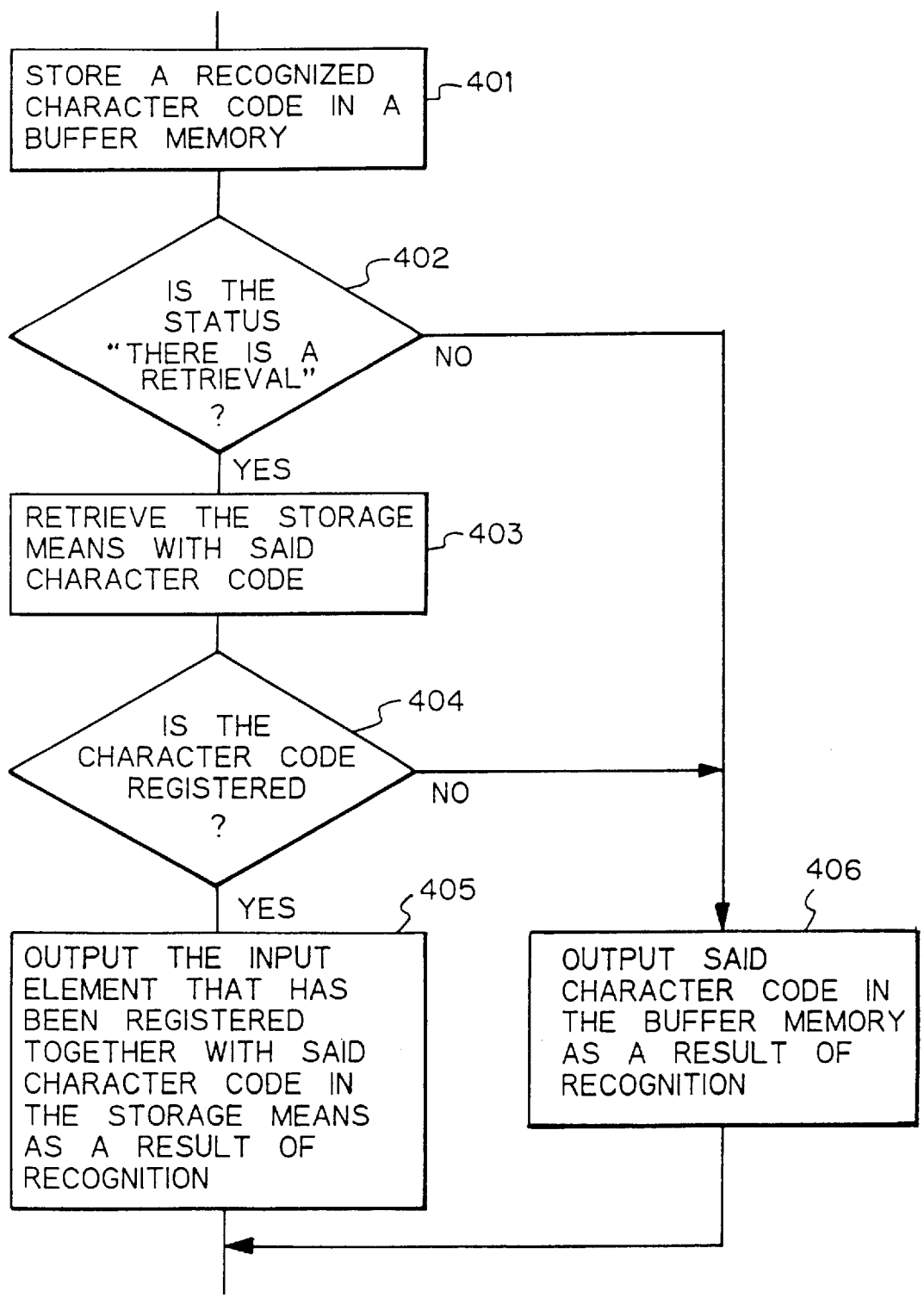
FIG. 5 is a flow diagram illustrating the processing of the retrieval unit.

FIG. 5 illustrates the flow of a processing of when the retrieval unit 19 is realized as a program.

A step 401 stores a recognized character code in a buffer memory of the main RAM 24, and a next step 402 checks the status flag set in the previous process flow of FIGS. 4(A) and 4(B) in response to the recognized character code.

When the status flag is "there is a retrieval", the retrieval is effected in regard to whether the character code has been registered or not in the list of "pairs of character codes and input elements" which have been stored and registered in the SRAM 23 which is the storage means 13 (steps 403 and 404). When the retrieval is successful, the input element that is registered together with the above character code is output as a result of recognition (step 405).

When the status flag is "there is no retrieval" or when the character code has not been registered in the storage unit 13, then the character code is output as a result of recognition (step 406).

Figure 8C:
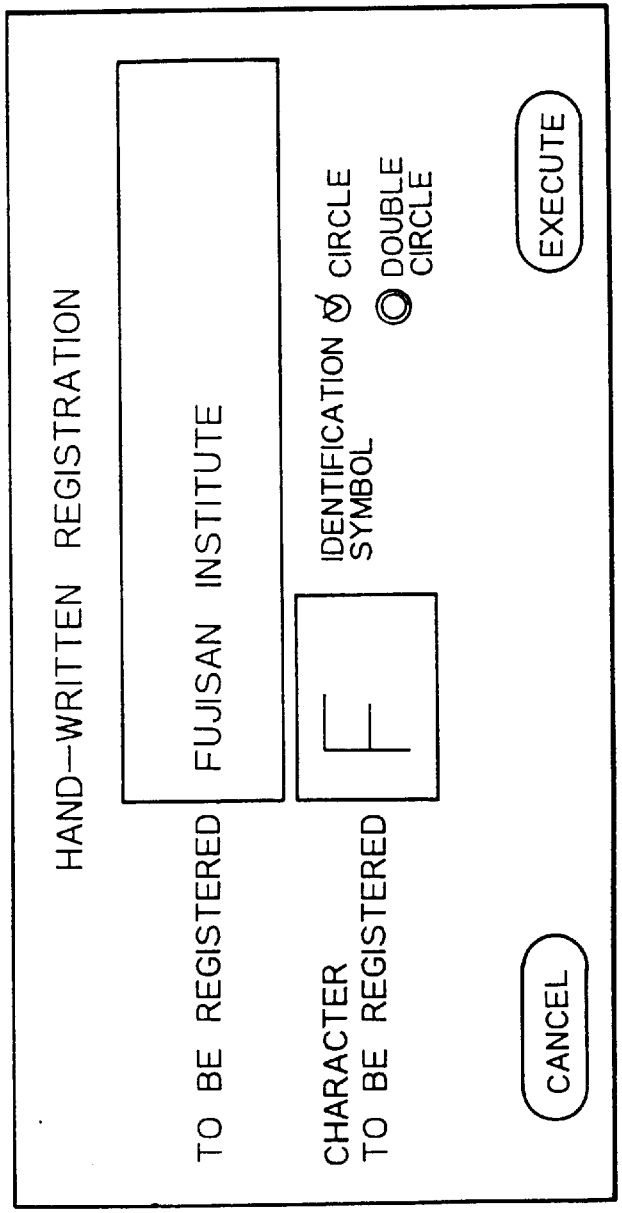
FIG. 8(C) is a diagram illustrating an example (3) of a screen of hand-written registration.

Furthermore, registration of the input element can be realized as a program that is to be executed by the CPU 21. FIG. 6 is a diagram illustrating the flow of registration operation by the registration unit 12. FIGS. 7(A) and 7(B) are a diagram of an example of a screen designating the input element during the registration operation. FIGS. 8(A), 8(B) and 8(C) are diagrams of an example of a screen for hand-written registration that is output to the liquid crystal display 32 during the registration operation.

In a step 501 shown in FIG. 6, first, the input element to be registered is designated by the input element designation unit 11. In an example shown in FIG. 7(A), a character string "FUJISAN INSTITUTE" is designated. The designation is carried out by, for example, tracing the character string displayed on the screen using a pen. After the input element is designated, the "hand-write registration" is designated by selecting the operation menu of the system or by inputting the hand-written stroke (step 502). FIG. 7(B) is an example of designation by the gesture input. The stroke input is the operation for writing a predetermined particular symbol on the tablet 31.

By designating "hand-written registration", the screen for hand-written registration as shown in, for example, FIG. 8(A) is displayed (step 503). Therefore, the input element ("FUJISAN INSTITUTE") to be registered is confirmed, and a character is written down by hand on a frame of character to be registered (step 504) as shown in FIG. 8(B). In this example, a character "F" is designated as the character for calling the input element that was designated previously. Units for writing the character down corresponds to the character designation unit 10 shown in FIG. 2. The result of recognizing the hand-written character "F" is displayed, for example, as shown in FIG. 8(C). Then, the execution button is touched with the pen (step 505) after having confirmed that the system has normally recognized the hand-written character.

Through a series of these operations, the input element ("FUJISAN INSTITUTE" in this example) is registered being corresponded to the code of the character "F" and is stored in the SRAM 23.

Figure 9A:
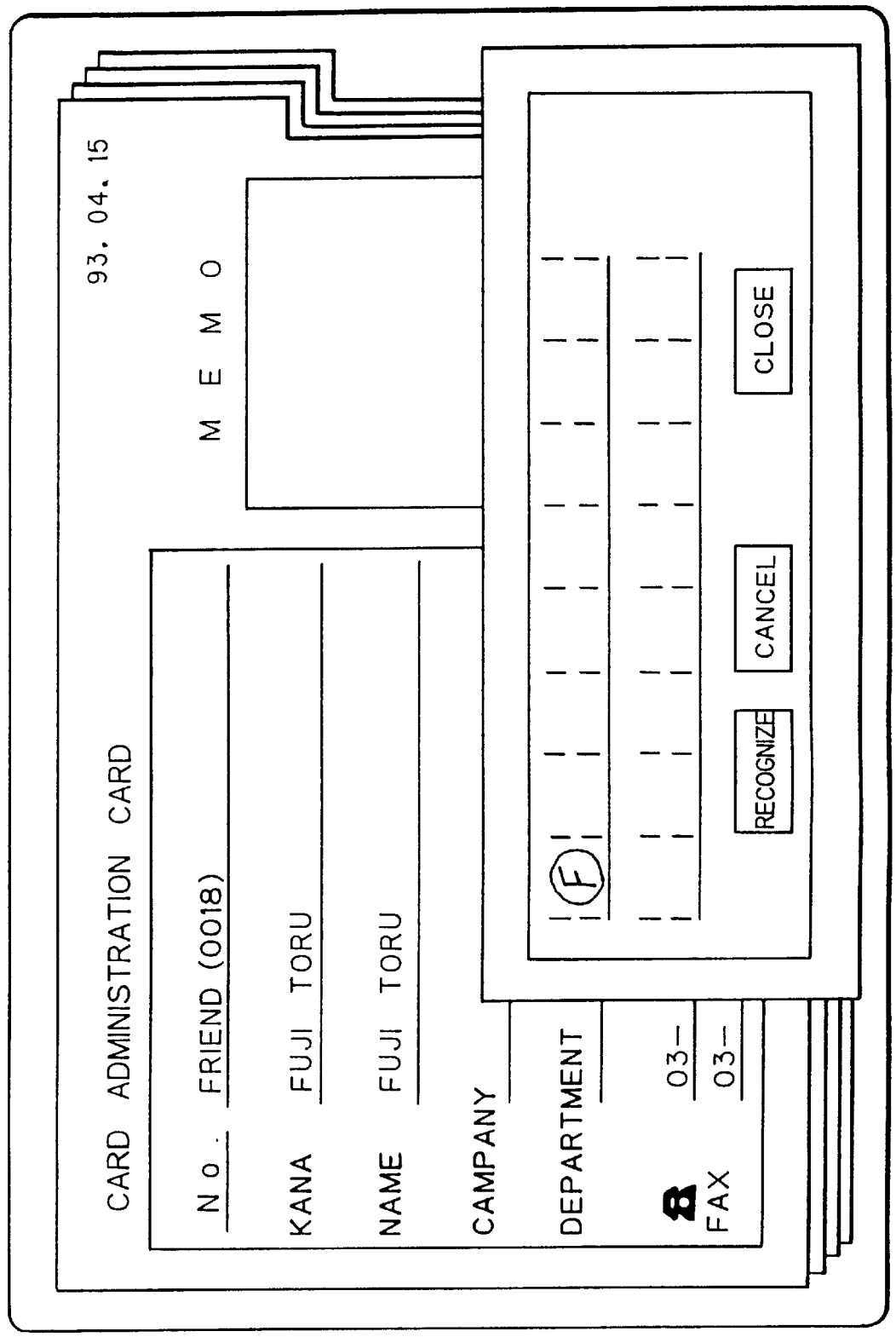
FIG. 9(A) is a diagram illustrating an example (1) of brief sketch input.
Figure 9B:
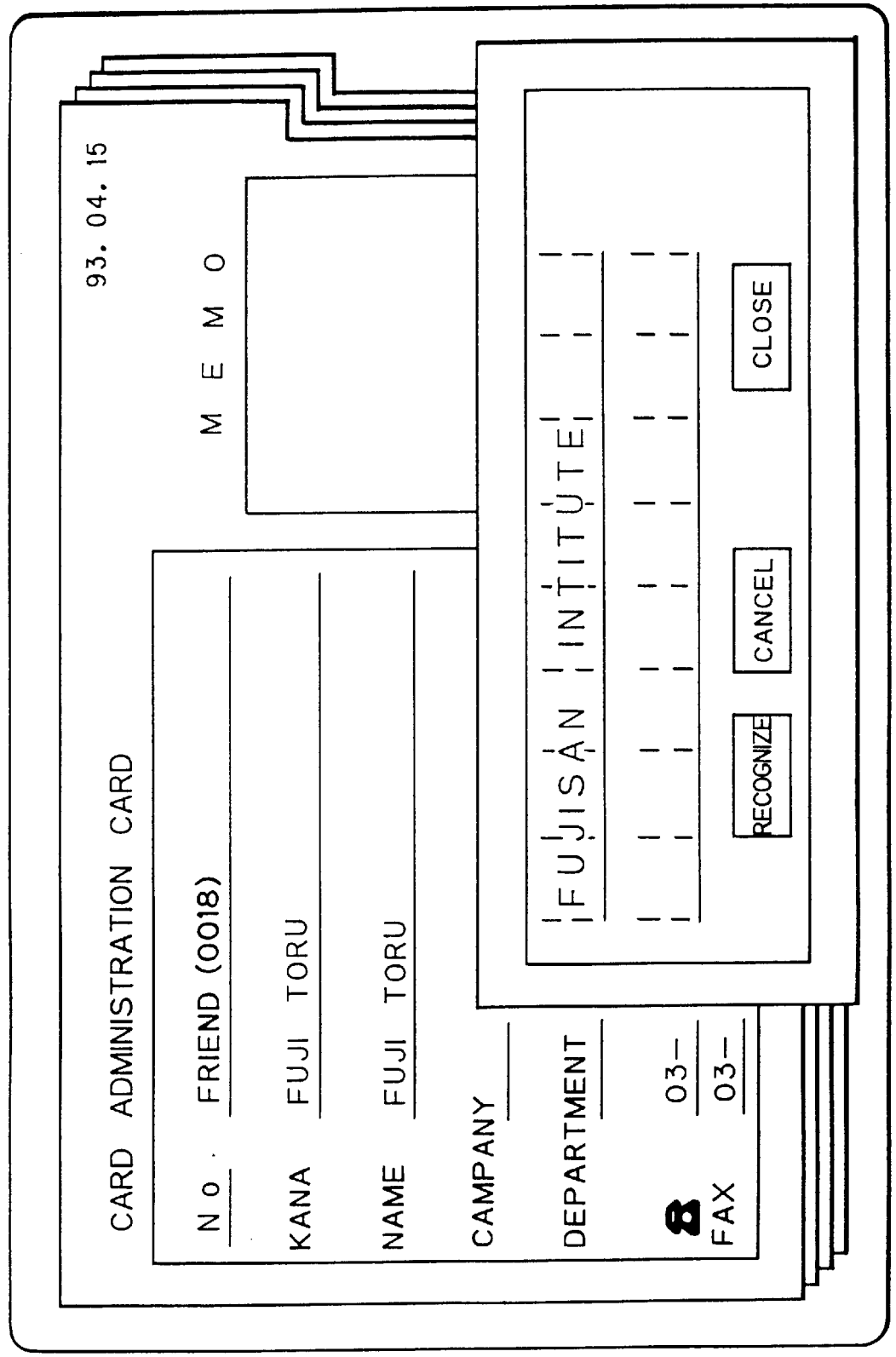
FIG. 9(B) is a diagram illustrating an example (2) of brief sketch input.

FIGS. 9(A) and 9(B) illustrate examples of inputting a symbol after the registration.

After the input element is registered, the character "F" is written down with a circle surrounding it as shown in FIG. 9(A). Then, as shown in FIG. 9(B), the system outputs the result of recognition as "FUJISAN INSTITUTE" instead of the character "F".

In this embodiment, the character string was exemplified as the input element. Without being limited to the character string, however, any string may be used as the input element (e.g., command string, figure, numerical expression, etc.) provided it can be handled by the system.

Furthermore, a circle of one stroke was exemplified as an identification stroke for retrieving the registered element. Here, however, any stroke may be used provided it can be easily identified from the strokes constituting the character string. Moreover, two or more strokes may be used.

Depending upon the systems, furthermore, a plurality of identification strokes may be used to change over the input elements that are to be registered. For example, a double circle ⊚ is used as an identification stroke in addition to a circle of one stroke, and either one of them is designated at the time of the hand-written registration, such that the input element can be registered. That is, the identification symbol is designated on the screen of hand-written registration shown in FIG. 8(C). In this case, the stroke detection unit 15 discriminates the identification stroke and the retrieval unit 19 outputs the input element depending upon the kind of the identification stroke. Then, a plurality of input elements can be registered for one character.

In the above-mentioned embodiment, the hand-written character recognition unit 18 outputs a character code as a result of recognition. However, a plurality of character codes may be output as candidates of recognition. In this case, the retrieval unit 19 retrieves the list of pairs of character codes and input elements registered in the storage unit 13 starting from the character code that is judged to be most probable. When there is any pair that has been registered, the input element found first is output.

In this embodiment, furthermore, when the recognized character code has not been registered in the storage unit 13 despite the identification stroke is detected, the character code is directly output. Instead of directly outputting the character code, however, (1) the user may be informed of that "no input element has been registered for the designated character code", or (2) the recognition processing may be effected again for the pattern of the input character before the identification stroke was deleted.

As described above, the present invention cheaply and efficiently provides a function with which frequently used character strings and command strings can be input by inputting a hand-written symbol.

I claim:

1. An apparatus for input-processing hand-written data in a computer system, said apparatus comprising:

hand-written character input means for inputting the hand-written data, said hand-written data comprising a hand-written character and a stroke pattern;

stroke detection means for detecting a predetermined particular stroke pattern indicating that a handwritten character combined therewith is a character for conversion, the combination thereof being provided by said hand-written character input means;

stroke deletion means for separating and deleting said predetermined particular stroke pattern from said hand-written character when notified by said stroke detection means that said predetermined particular stroke pattern is detected;

hand-written character recognition means for recognizing as a character code said hand-written character provided by said hand-written character input means when said predetermined particular stroke pattern is not detected and provided by said stroke deletion means when said predetermined particular stroke pattern is detected;

character designation means for designating a character recognizable by said hand-written character recognition means;

input element designation means for designating an input element comprising at least one of a plurality of characters words and figures to be converted from said character code designated by said character designation means;

registration means for registering a pair of said character code designated by said character designation means and the corresponding input element designated by said input element designation means;

storage means for storing said pair of a character code and an input element registered by said registration means; and retrieval means, if the detection of said predetermined particular stroke pattern is notified by said stroke detection means, for retrieving said character code recognized by said hand-written character recognition means and stored by said storage means, and outputting said corresponding input element instead of said recognized character code, and if not notified, for outputting the recognized character code.

2. An apparatus for input-processing hand-written data according to claim 1, wherein when the pattern of the input hand-written character comprises at least two strokes and further one of a first stroke and a last stroke of the at least two strokes of the pattern comprises a predetermined particular shape, said stroke detection means detects said one of the first stroke and the last stroke as the predetermined particular stroke pattern.

3. An apparatus for input-processing hand-written data according to claim 1, wherein if said hand-written character recognition means does not recognize the hand-written character from the pattern of the hand-written character from which the particular stroke is detected by said stroke detection means and from which the predetermined particular stroke is deleted by said stroke deletion means, recognition processing is repeated for the hand-written character from which the particular stroke is not deleted.

4. An apparatus for input-processing data according to claim 1, wherein:

said stroke detection means detects a plurality of kinds of strokes;

said registration means registers a different input element for every kind of stroke detected for a recognizable character; and said retrieval means retrieves and outputs an input element that is registered depending upon a recognized character code and upon the kind of the detected stroke.

5. An apparatus for input-processing hand-written data according to claim 1, wherein said hand-written character recognition means nominates a plurality of character codes corresponding to input elements as candidates as a result of recognizing the pattern of the hand-written character from which the predetermined particular stroke is detected by said stroke detection means and from which said predetermined particular stroke is deleted by said stroke deletion means, and said retrieval means for detecting a presence of input elements registered in relation to the plurality of character codes in an order of decreasing probability starting from a character code most probable among the plurality of character codes based on a group of candidate characters, and outputs the input element and a corresponding character code when the input element has been registered.

6. An apparatus for input-processing hand-written data according to claim 1, wherein said hand-written character recognition means comprises a recognition dictionary recognizing the hand-written character.

7. An apparatus for input-processing hand-written data according to claim 1, wherein said registration means comprises character designation means for designating a character to be registered, and storage means for storing a combination of the designated character and the input element, wherein said input element designation means designates the input element to be registered in relation to a designated character.

8. A method for input-processing hand-written data in a computer system, comprising the steps of:

a hand-written character input step for inputting the hand-written data, said hand-written data comprising a hand-written character and a stroke;

a stroke detection step for detecting a predetermined particular stroke pattern indicating that a hand-written character combined therewith is a character for conversion;

a stroke deletion step for separating and deleting said predetermined particular stroke pattern from said hand-written character when said predetermined particular stroke pattern is detected;

a hand-written character recognition step for recognizing as a character code the hand-written character from said hand-written character input step when said predetermined particular stroke pattern is not detected, and from said stroke deletion step when said predetermined particular stroke pattern is detected;

a character designation step for designating a character code recognizable in said hand-written character recognition step;

an input element designation step for designating an input element comprising at least one of a plurality of characters, words, and figures to be converted from said character code designated in said character designation step;

a registration step for registering a pair of a character code designated in said character designation step and the corresponding input element designated in said input element designation step;

a storage step for storing said pair of a character code and an input element; and a retrieval step, if said predetermined particular stroke pattern is detected, for retrieving said character code recognized in said hand-written character recognition step and stored in said storage step, and outputting said corresponding input element instead of said recognized character code, and if not detected, for outputting said recognized character code.

9. A method for input-processing hand-written data according to claim 8, wherein said stroke detection step comprises the steps of:

storing the pattern of the hand-written character in a buffer memory;

initializing a status flag into a state of "no retrieval";

checking a number of strokes of the pattern of the hand-written character; and checking shapes of a first stroke and a last stroke of the hand-written character.

10. A method for input-processing hand-written data according to claim 9, wherein said stroke deletion step comprises the steps of:

deleting the first stroke from the pattern of the hand-written character if the first stroke is recognized as the predetermined particular stroke;

deleting the last stroke from the pattern of the hand-written character if the last stroke is recognized as the predetermined particular stroke; and setting the status flag into a state of "there is a retrieval".

11. A method for input-processing hand-written data according to claim 10, wherein said retrieval step comprises the steps of:

storing a recognized character code in a buffer memory;

checking whether the status flag is set to "there is a retrieval";

retrieving from storage means with said character code and checking a character code to determine whether the input element corresponding to the character code is registered, if the status flag is set to "there is a retrieval";

, outputting the input element that has been registered together with said character code as a result of recognition, if the input element is registered; and outputting said character code in the buffer memory as a result of recognition, if one of the input element is not registered and the status flag is set to "no retrieval".

* * * * *